United States Patent
Holm

(10) Patent No.: US 6,822,927 B1
(45) Date of Patent: Nov. 23, 2004

(54) SUBMERSIBLE ICE FISHING TROLLER SYSTEM

(76) Inventor: Charles E. Holm, P.O. Box 65, Clearbrook, MN (US) 56634

( * ) Notice: Subject to any disclaimer, the term of this patent is extended or adjusted under 35 U.S.C. 154(b) by 0 days.

(21) Appl. No.: 10/629,087

(22) Filed: Jul. 28, 2003

(51) Int. Cl.$^7$ .............................................. G01S 15/96
(52) U.S. Cl. ....................... 367/107; 367/910; 43/26.1; 43/43.12
(58) Field of Search ................................ 367/107, 910; 43/4, 17.1, 26.1, 43.12, 26.15

(56) References Cited

U.S. PATENT DOCUMENTS

| | | | |
|---|---|---|---|
| 3,613,284 A | * 10/1971 | Anderson | 43/26.1 |
| 4,349,978 A | 9/1982 | Phillip | 43/19.2 |
| 4,453,336 A | * 6/1984 | Lowden | 43/43.12 |
| 4,509,287 A | 4/1985 | Hood | 43/19.2 |
| 4,757,633 A | * 7/1988 | Van Cleve | 43/26.1 |
| 4,888,747 A | 12/1989 | Williams | 367/173 |
| 4,926,399 A | 5/1990 | Hickman | 367/173 |
| 5,016,385 A | 5/1991 | Blease | 43/26.1 |
| 5,152,095 A | * 10/1992 | Combs, III | 43/43.12 |
| 5,154,016 A | * 10/1992 | Fedora et al. | 43/26.1 |
| 5,185,950 A | 2/1993 | Hood | 43/19.2 |
| 5,461,815 A | 10/1995 | Rodgers | 43/17.6 |
| 5,546,362 A | 8/1996 | Baumann et al. | 367/173 |
| 5,546,695 A | 8/1996 | Langer | 43/44.98 |
| 5,581,930 A | 12/1996 | Langer | 43/17 |
| 5,627,802 A | 5/1997 | Langer | 367/188 |
| 5,828,761 A | 10/1998 | Langer | 381/91 |
| 5,887,376 A | 3/1999 | Currier et al. | 43/17 |
| 6,122,852 A | * 9/2000 | Mechling, IV | 43/4 |
| 6,160,764 A | 12/2000 | Powell | 367/173 |
| 6,421,301 B1 | 7/2002 | Scanlon | 367/173 |
| 2002/0085452 A1 | 7/2002 | Scanlon | 367/188 |

* cited by examiner

Primary Examiner—Ian J. Lobo

(57) ABSTRACT

A submersible ice fishing troller system for efficiently trolling a fishing lure or bait beneath an ice surface. The submersible ice fishing troller system includes a submersible unit in communication with a control unit, sonar for bottom and fish detection, a downrigger clip attached to the submersible unit, and a line release attached to the submersible unit. An actuator unit mechanically connected to the line release allows for selective release of the fishing line from the line release after a fish has bitten. The submersible unit automatically travels to the bottom of the ice after the line release has been opened.

18 Claims, 11 Drawing Sheets

SUBMERSIBLE ICE FISHING TROLLER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to trolling devices and more specifically it relates to a submersible ice fishing troller system for efficiently trolling a fishing lure or bait beneath an ice surface and locating fish on sonar.

2. Description of the Related Art

Ice fishing is a popular sport in the northern states. Ice fishing involves the drilling of an ice hole into the ice and then lowering a fishing line with a lure/bait attached to the distal end thereof through the ice hole. The main problem with conventional ice fishing techniques is that no movement of the bait/lure is achieved other than an up/down vertical movement caused by the user raising/lowering their rod.

Examples of patented devices which may be related to the present invention include U.S. Pat. No. 5,016,385 to Blease; U.S. Pat. No. 5,185,950 to Hood; U.S. Pat. No. 4,926,399 to Hickman; U.S. Pat. No. 5,546,362 to Baumann et al.; U.S. Pat. No. 5,627,802 to Langer; U.S. Pat. No. 5,828,761 to Langer; U.S. Pat. No. 5,887,376 to Currier et al.; U.S. Pat. No. 6,160,764 to Powell; U.S. Pat. No. 6,421,301 to Scanlon; U.S. Patent 2002/0085452 to Scanlon; U.S. Pat. No. 5,546,695 to Langer; U.S. Pat. No. 5,461,815 to Rodgers; U.S. Pat. No. 4,888,747 to Williams; and U.S. Pat. No. 4,509,287 to Hood.

While these devices may be suitable for the particular purpose to which they address, they are not as suitable for efficiently trolling a fishing lure or bait beneath an ice surface and none of them allow for the locating of fish. Conventional ice fishing techniques do not allow the fisherman to actively move the lure/bait similar to trolling on open water.

In these respects, the submersible ice fishing troller system according to the present invention substantially departs from the conventional concepts and designs of the prior art, and in so doing provides an apparatus primarily developed for the purpose of efficiently trolling a fishing lure or bait beneath an ice surface.

BRIEF SUMMARY OF THE INVENTION

In view of the foregoing disadvantages inherent in the known types of trolling devices now present in the prior art, the present invention provides a new submersible ice fishing troller system construction wherein the same can be utilized for efficiently trolling a fishing lure or bait beneath an ice surface.

The general purpose of the present invention, which will be described subsequently in greater detail, is to provide a new submersible ice fishing troller system that has many of the advantages of the trolling devices mentioned heretofore and many novel features that result in a new submersible ice fishing troller system which is not anticipated, rendered obvious, suggested, or even implied by any of the prior art trolling devices, either alone or in any combination thereof.

To attain this, the present invention generally comprises a submersible unit in communication with a control unit, a downrigger clip attached to the submersible unit, a line release attached to the submersible unit, and sonar. An actuator unit mechanically connected to the line release and remotely activated allows for selective release of the fishing line from the line release after a fish has bitten. The submersible unit automatically travels to the bottom of the ice after the line release has been opened.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a submersible ice fishing troller system that will overcome the shortcomings of the prior art devices.

A second object is to provide a submersible ice fishing troller system for efficiently trolling a fishing lure or bait beneath an ice surface.

A further object is to provide a submersible ice fishing troller system for locating fish beneath an ice surface.

Another object is to provide a submersible ice fishing troller system that is simple to operate and utilize.

An additional object is to provide a submersible ice fishing troller system that is capable of trolling within a body of water beneath an ice surface.

A further object is to provide a submersible ice fishing troller system that is remotely operated.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
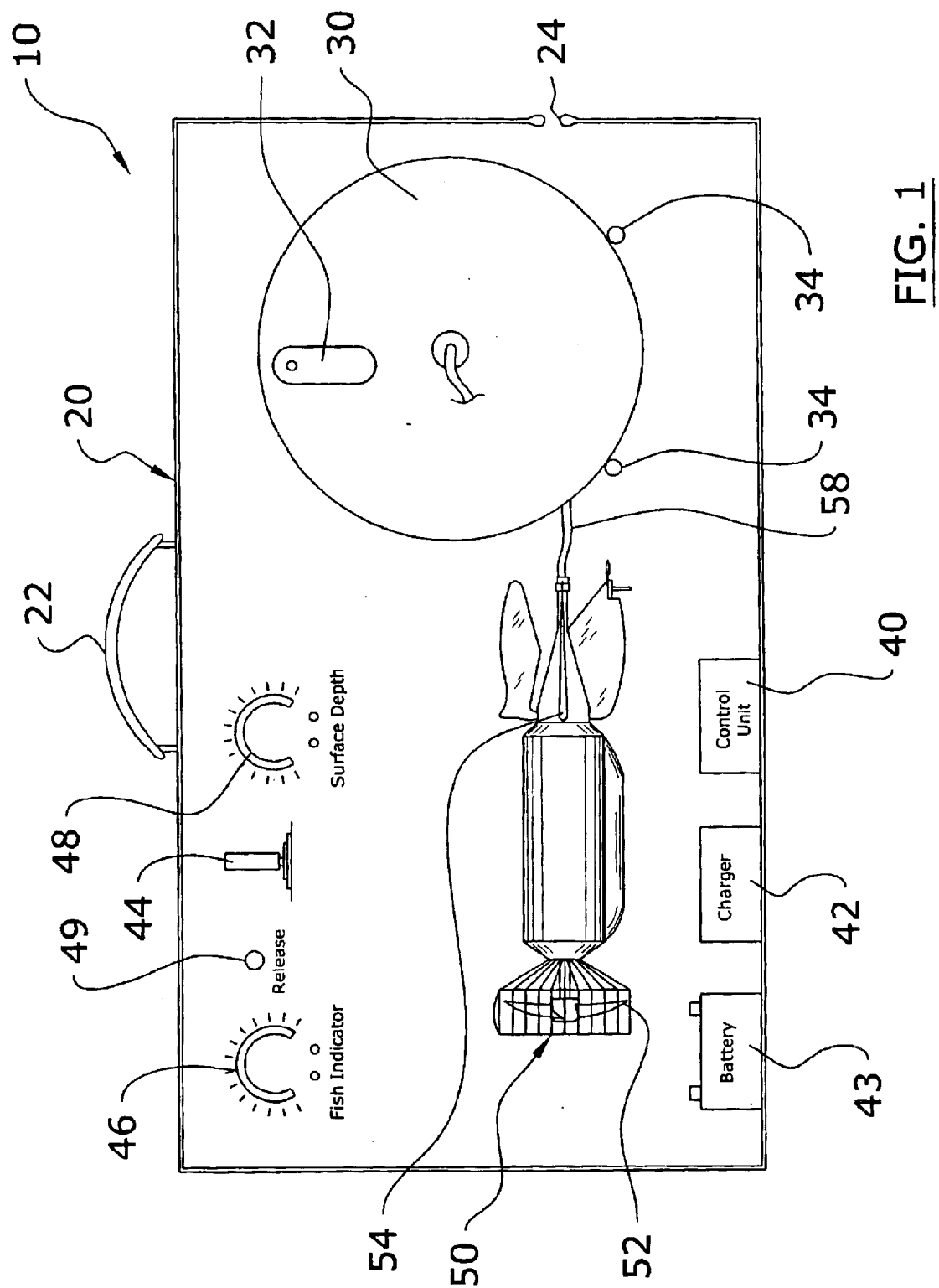
FIG. 1 is a side view of the present invention stored within a storage case.
Figure 2:
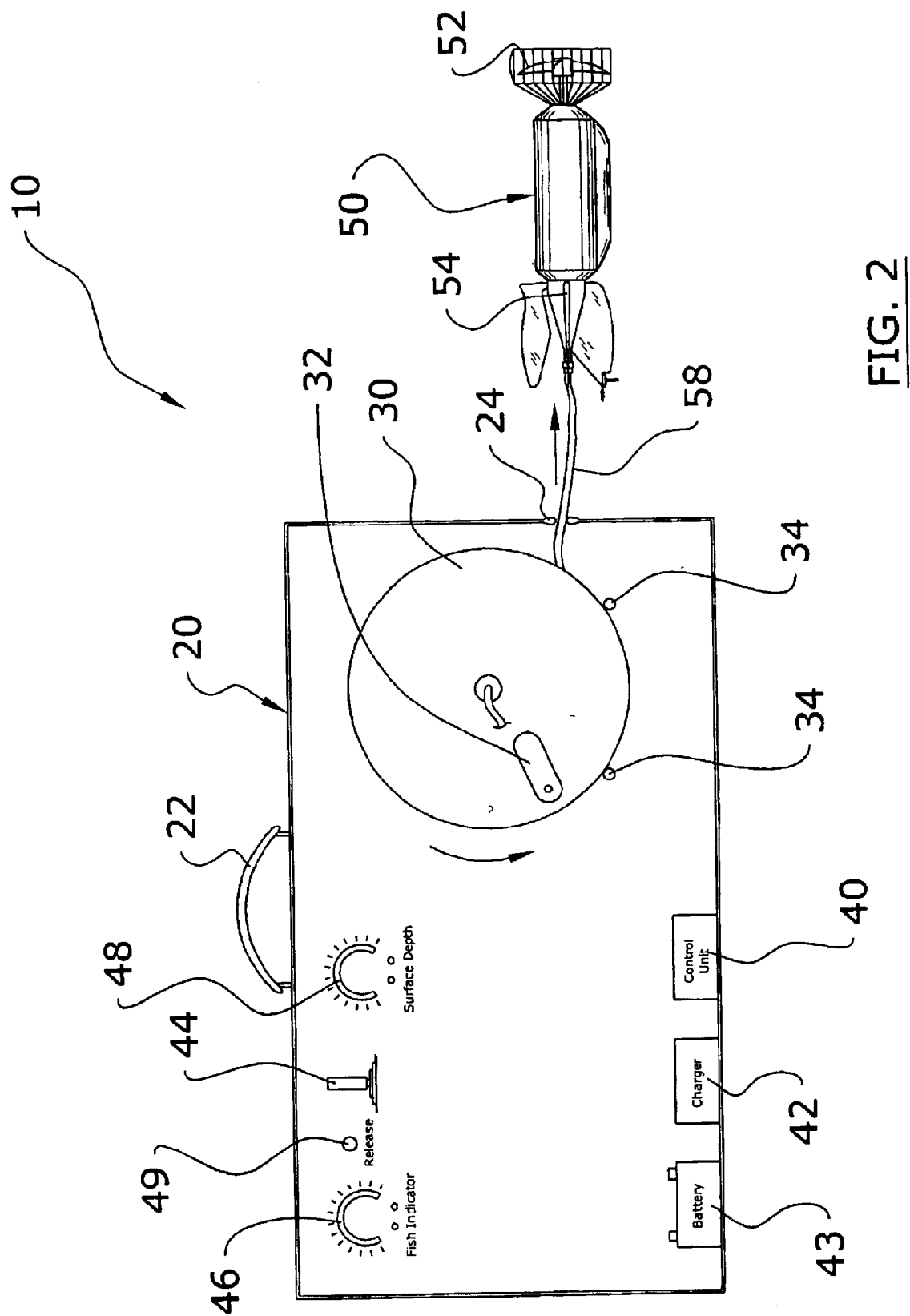
FIG. 2 is a side view of the present invention illustrating the submersible unit removed from the storage case.

Turning now descriptively to the drawings, in which similar reference characters denote similar elements throughout the several views, FIGS. 1 through 9b illustrate a submersible ice fishing troller system 10, which comprises a submersible unit 50 in communication with a control unit 40, a downrigger clip 60 attached to the submersible unit 50, and a line release 70 attached to the submersible unit 50. An actuator unit 72 mechanically connected to the line release 70 allows for selective 11 release of the fishing line 14 from the line release 70 after a fish has bitten. The submersible unit 50 automatically travels to the bottom of the ice after the line release 70 has been opened.

B. Submersible Unit

The submersible unit 50 is comprised of a miniature submarine structure that is capable of being submerged and operated within cold-water environments. The submersible unit 50 is preferably capable of lowering, rising, moving forward, moving rearward and steering within a volume of water. The submersible unit 50 may be comprised of various well known technologies utilized today to operate submersible devices. The submersible unit 50 is preferably controlled by a control unit 40, however various automation features may be incorporated within the submersible unit 50.

Figure 3:
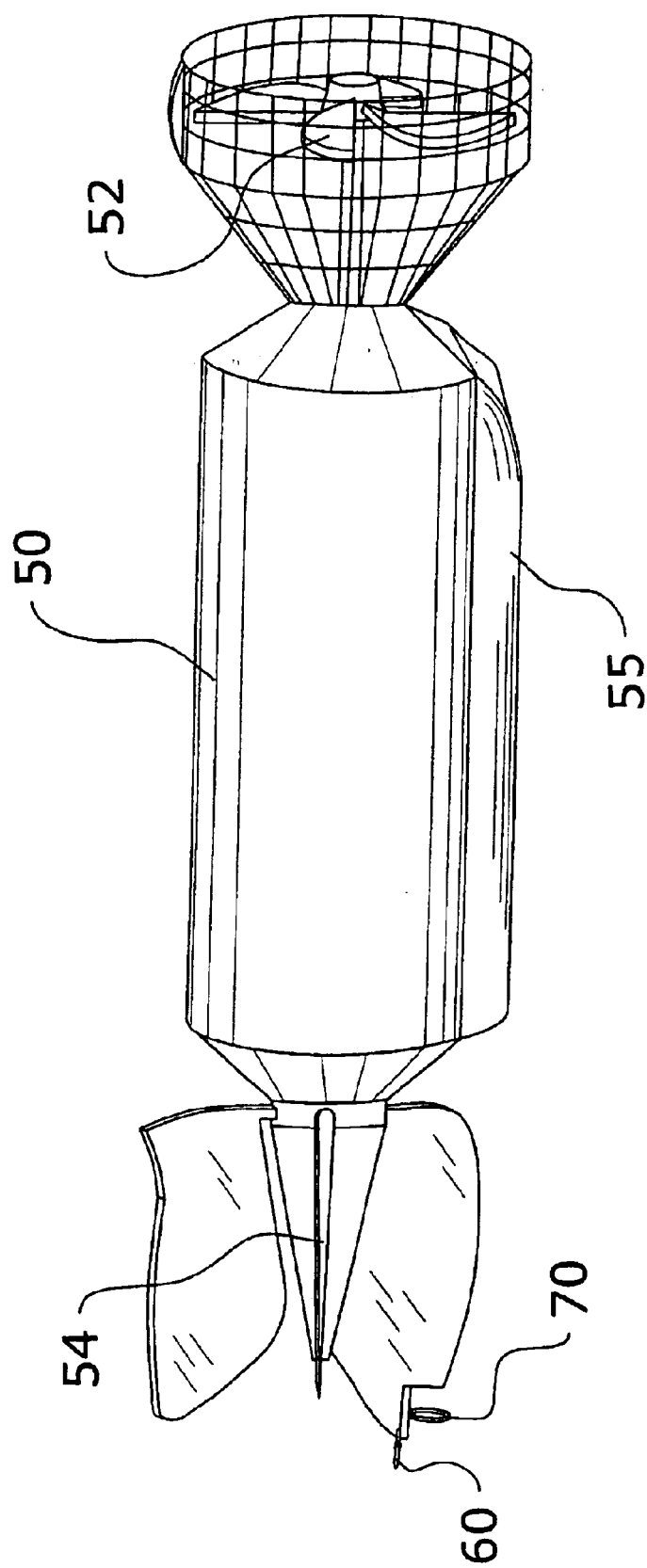
FIG. 3 is a perspective view of the submersible unit.
Figure 4:
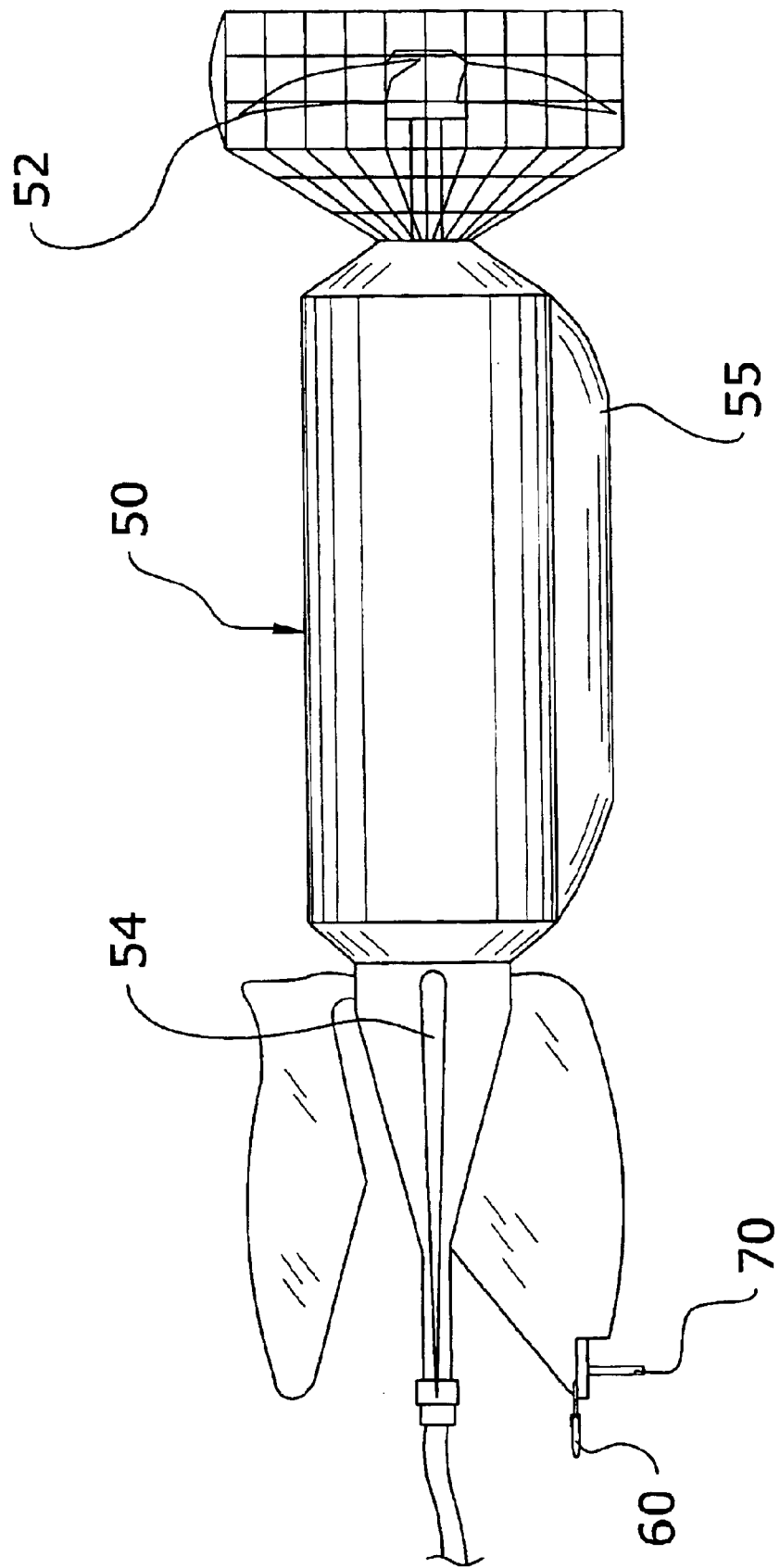
FIG. 4 is a side view of the submersible unit.

An exemplary submersible unit 50 is illustrated in FIGS. 3 and 4 of the drawings. The submersible unit 50 preferably has one or more control fins 54 at a rear portion of the body with a propeller unit 52 at a front portion of the body. The control fins 54 allow for controlling the steering of the submersible unit 50 while the propeller unit 52 drives the submersible unit 50 within the water. Various other configurations may be utilized to construct the submersible unit 50 to operate within a water environment other than shown in the drawings.

The submersible unit 50 preferably includes a first sonar 51 and a second sonar 53. The first sonar 51 preferably faces downwardly from the submersible unit 50 for determining the floor of the body of water and the location of fish. The second sonar 53 preferably faces upwardly from the submersible unit 50 for determining the distance beneath the surface ice of the body of water. The submersible unit 50 also preferably contains a battery to minimize size of control cable.

The control unit 40 is in communication with the submersible unit 50 via various communication means such as but not limited to radio communication and electrical communication through a control cable 58. A control cable 58 is preferably utilized to allow for drawing of the submersible unit 50 back through the ice hole 16 for reloading of the fishing line 14, lure or bait 18 and maintenance. The individual electrical components of the submersible unit 50 are in communication with the control unit 40 whereby the user controls and monitors the same through the control unit 40.

The control unit 40 is preferably integrally formed within a storage case 20 as best shown in FIG. 1 of the drawings. The storage case 20 preferably has a case handle 22 for transportation purposes. The storage case 20 preferably is capable of storing and recharging the submersible unit 50 when not in use as shown in FIG. 1 of the drawings.

Figure 5:
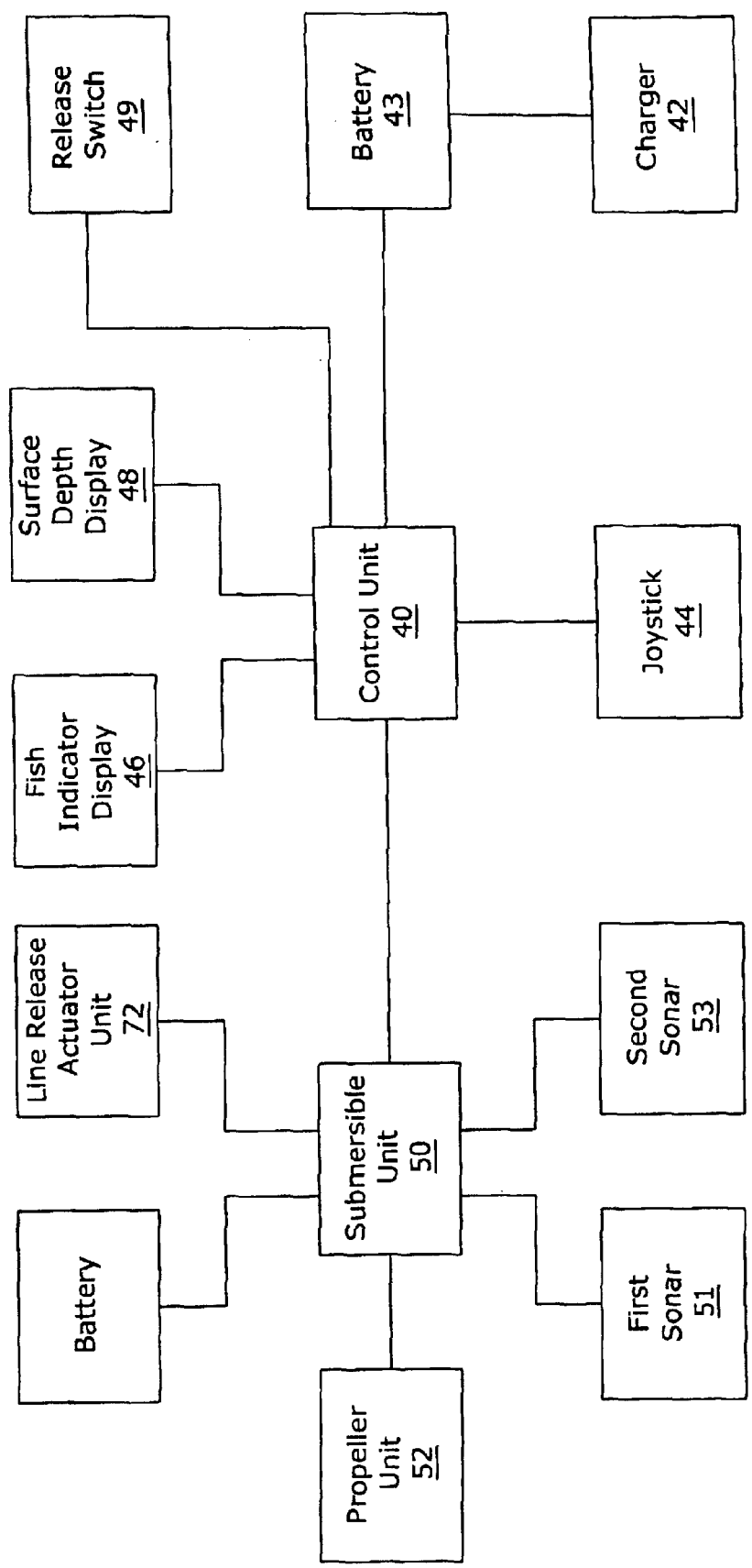
FIG. 5 is a block diagram of the electrical components of the present invention.

A battery 43 and a charger 42 are preferably in electrical communication with the control unit 40 for providing electrical power to the system as shown in FIG. 5 of the drawings. It can be appreciated that the control unit 40 and submersible unit 50 may be electrically powered by other means than shown in the drawings.

The storage case 20 preferably includes a fish indicator display 46 for displaying the location of fish and the lake bottom as measured by the first sonar 51. The storage case 20 further preferably includes a surface depth display 48 for displaying the depth of the submersible unit 50 in relation to the ice layer as measured by the second sonar 53. A joystick 44 or other control device allows the user to control the movements of the submersible unit 50 beneath the surface ice. It can be appreciated that various other technologies may be utilized upon the present invention such as but not limited to underwater cameras.

A cable reel 30 is positioned within the storage case 20 for dispensing the control cable 58 through a cable aperture 24 within the storage case 20. A reel handle 32 attached to the cable reel 30 allows the user to rotate the cable reel 30 when dispensing or retracting the control cable 58. One or more guide members 34 may be utilized near the cable reel 30 for ensuring that the control cable 58 is properly fed into and from the cable reel 30.

Figure 9B:
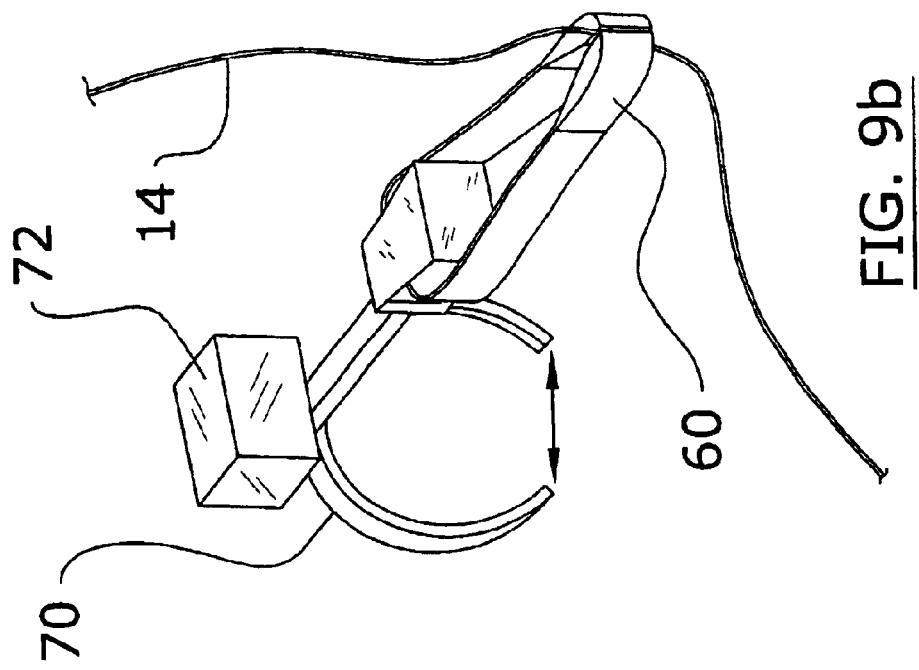
FIG. 9b is a perspective view of the fishing line non-movably positioned within the downrigger clip.
Figure 9A:
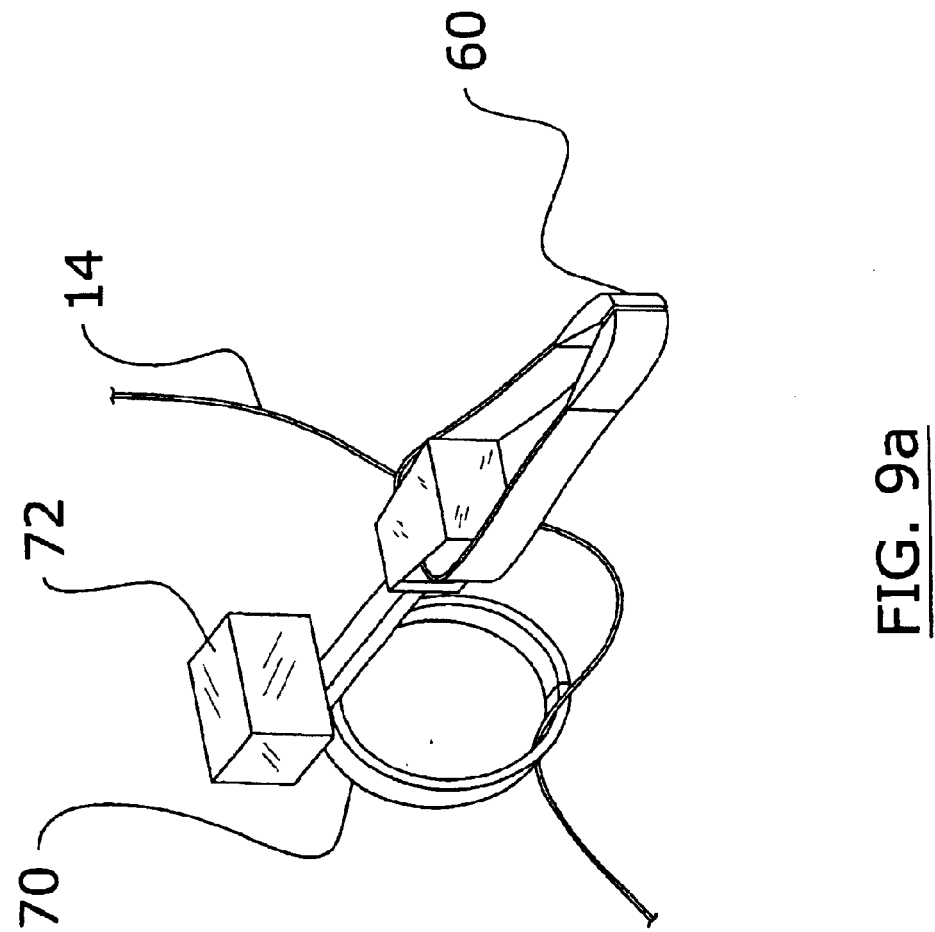
FIG. 9a is a perspective view of the fishing line movably positioned within the line release.

The control unit 40 has a release switch 49 for allowing a user to control the opening of the line release 70 as shown in FIGS. 9a and 9b of the drawings. The release switch 49 is in communication with the control unit 40. When the release switch 49 is closed, the control unit 40 sends a signal to the submersible unit 50 which then activates the actuator unit 72 to open the jaws of the line release 70. The submersible unit 50 preferably automatically travels to the bottom of the ice after the line release 70 has been opened.

C. Line Release

The line release 70 is attached to the submersible unit 50 as shown in FIGS. 3, 4, 6a and 6b of the drawings. The line release 70 preferably has a first jaw and a second jaw for selectively releasing a fishing line 14. The line release 70 is utilized with live bait 18 to allow the fishing line 14 to freely pass through the line release 70.

Figure 6B:
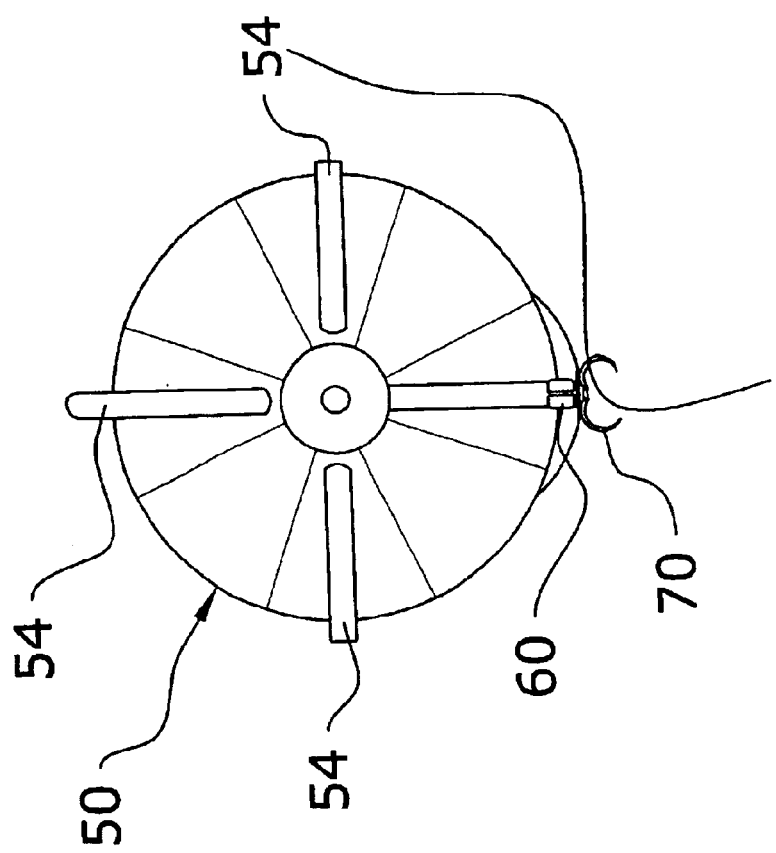
FIG. 6b is a rear view of the submersible unit with the line release opened.
Figure 6A:
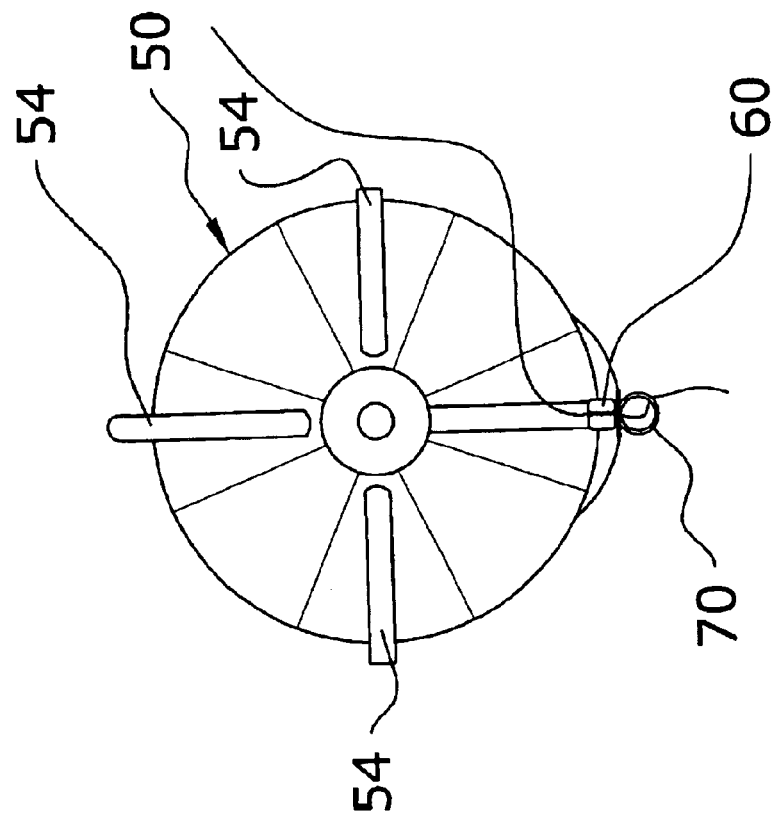
FIG. 6a is a rear view of the submersible unit with the line release closed.
Figure 7:
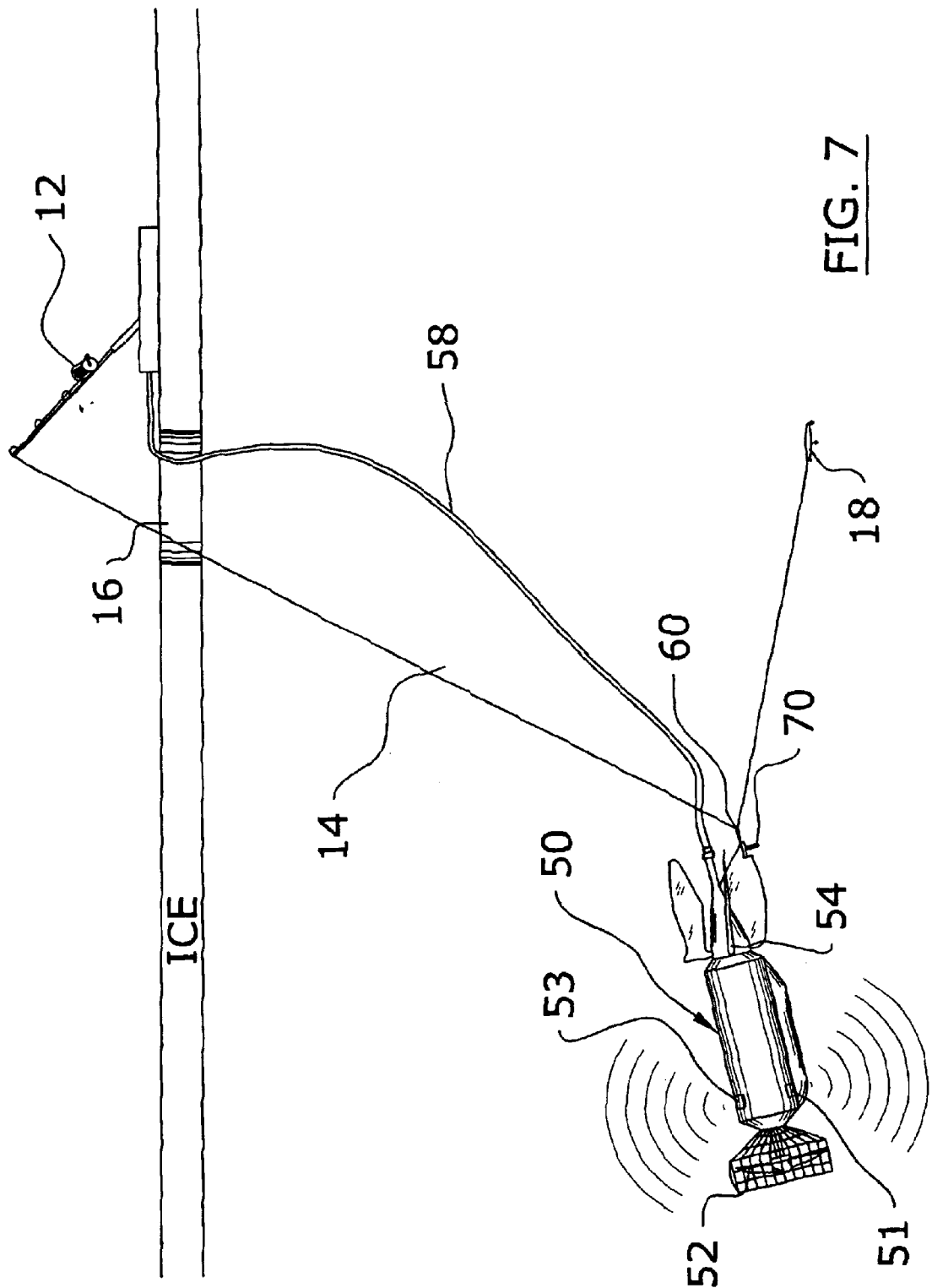
FIG. 7 is a side view of the present invention beneath an ice surface with a fishing lure and the fishing line attached to the downrigger clip for trolling.
Figure 8A:
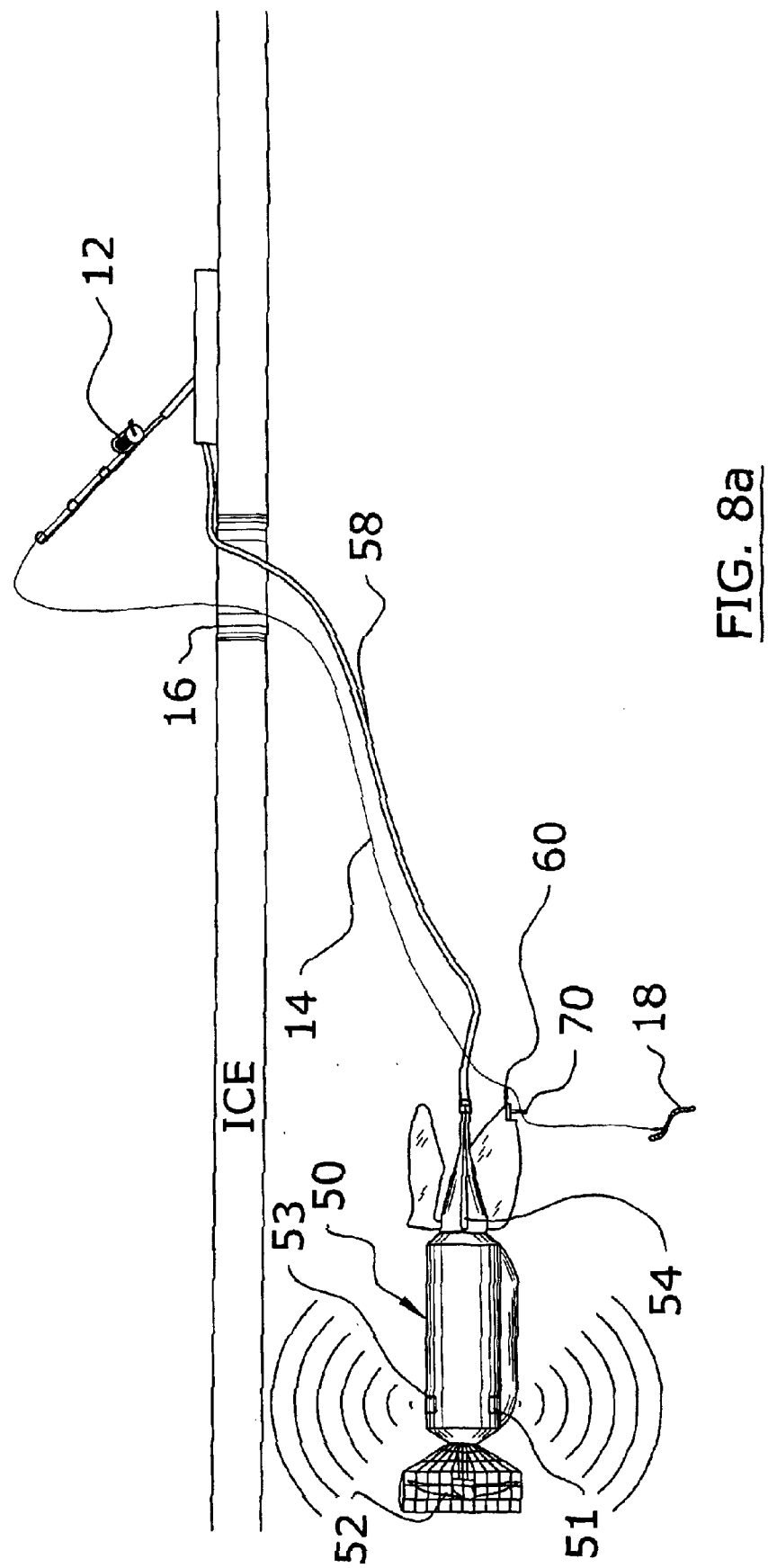
FIG. 8a is a side view of the present invention beneath the ice surface with live bait and the fishing line secured within the downrigger clip and the line release prior to lowering bait.
Figure 8B:
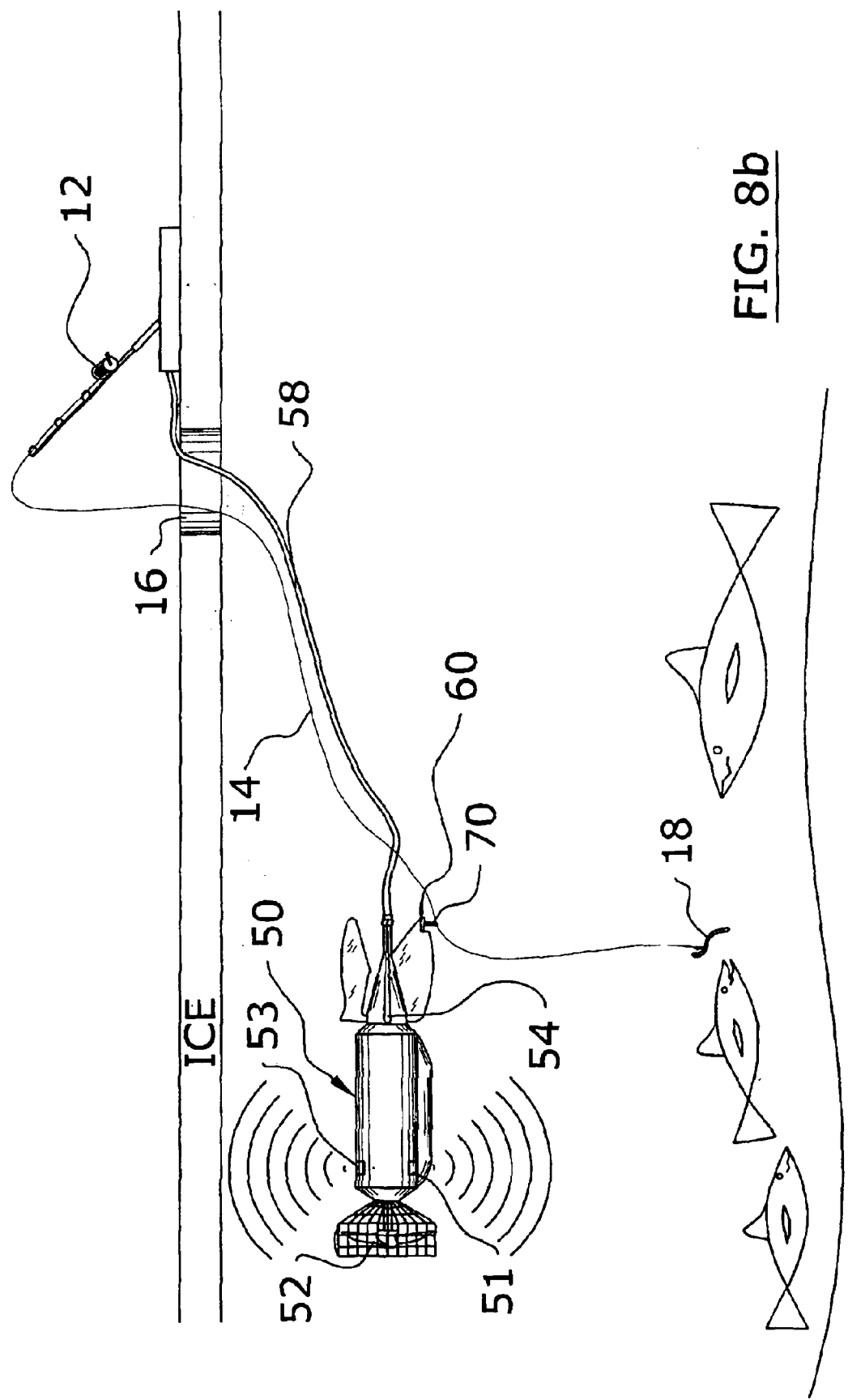
FIG. 8b is a side view of the present invention beneath the ice surface with the fishing line released from the downrigger clip, but within the line release and the live bait lowered near the fish.
Figure 8C:
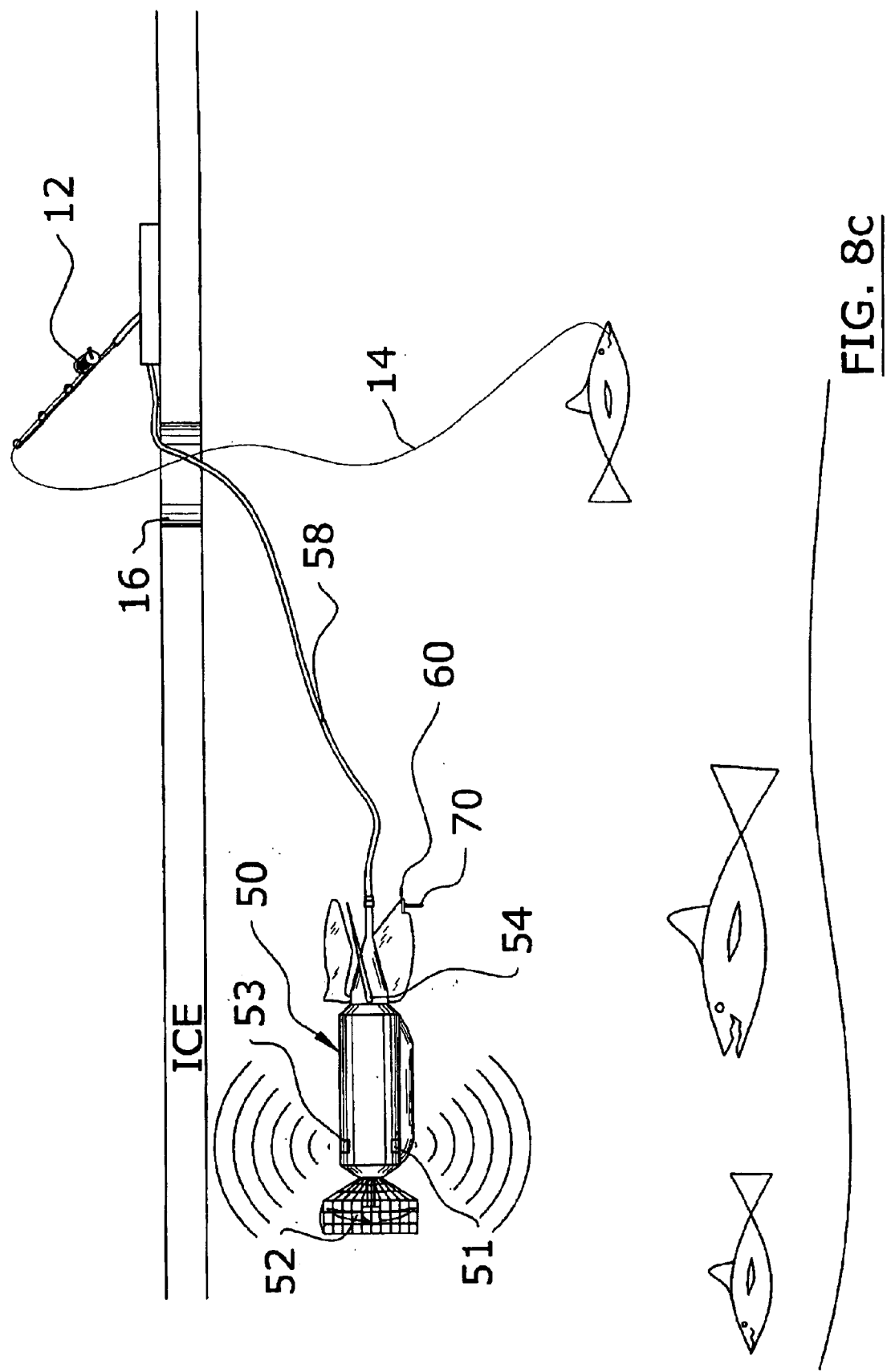
FIG. 8c is a side view of the present invention surfacing after the line release has been actuated due to a fish biting.

The line release 70 includes an actuator unit 72 mechanically connected to first jaw and the second jaw for manipulating the first jaw and the second jaw. The first jaw and the second jaw preferably form an enclosed circular structure when closed as shown in FIGS. 6a and 9a of the drawings. The first jaw and the second each preferably have a C-shaped structure as further shown in FIGS. 6b and 9b of the drawings.

As shown in FIGS. 3 and 4 of the drawings, the line release 70 is attached to a rear portion of the submersible unit 50 away from the propeller unit 52. This allows for the fishing line 14 to be pulled through the water without interference with the propeller unit 52. As further shown in FIGS. 3 and 4 of the drawings, the line release 70 is preferably attached to one of a plurality of control fins 54 of the submersible unit 50, preferably the lowest portion of the control fins 54.

D. Downrigger Clip

FIGS. 3 and 4 illustrate a downrigger clip 60 attached to the submersible unit 50. The downrigger clip 60 is preferably attached to a rear portion of the submersible unit 50 and may have any structure commonly utilized within the downrigger industry. The downrigger clip 60 frictionally engages the fishing line 14 for supporting a lure 18 while pulling the lure 18 through the water.

E. Operation

If the user is utilizing live bait 18, the user first attaches the fishing line 14 to the downrigger clip 60 approximately 18 inches from the bait, then opens the jaws of the line release 70 and inserts the fishing line 14 within the line release 70. The jaws may be manually opened or electronically opened. The user then closes the jaws of the line release 70 and lowers the submersible unit 50 through the ice hole 16 within the ice layer. The user then controls the position of the submersible unit 50 directly under the ice to locate fish using the control unit 40. When fish are located via sonar, the user then tugs upon the fishing line 14 once to release the fishing line 14 from the downrigger clip 60. The fishing line 14 is then let out to allow the live bait 18 to be lowered to the fish. When a fish bites, the user allows the fish to "run" with the fishing line 14 a finite distance as the fishing line 14 freely passes through the line release 70. The user then selects the release switch 49 thereby activating the actuator unit 72 which opens the jaws of the line release 70. The fisherman then plays and captures the fish. The fisherman then pulls the submersible unit 50 through the ice hole 16 for reattaching the fishing line 14 of the fishing rod 12.

If the user is utilizing a lure, the user simply attaches the fishing line 14 within the jaws of the downrigger clip 60 as shown in FIG. 9b of the drawings. The user then lowers the submersible unit 50 through the ice hole 16 within the ice layer. The user then controls the position of the submersible unit 50 using the control unit 40. When a fish bites, this removes the fishing line 14 from the downrigger clip 60. The user then selects the release switch 49 thereby causing the submersible unit 50 to automatically surface to allow for the fisherman to bring the fish into the ice hole 16 unobstructed. The fisherman then pulls the submersible unit 50 through the ice hole 16 for reattaching the fishing line 14 of the fishing rod 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A submersible ice fishing troller system, comprising:
   a submersible unit in communication with a control unit;
   a downrigger clip attached to said submersible unit;
   a line release attached to said submersible unit, wherein said line release has a first jaw and a second jaw that form an opening that slidably receives a fishing line when in a closed position and for selectively releasing a fishing line when in an open position; and
   an actuator unit mechanically connected to said first jaw and said second jaw.

2. The submersible ice fishing troller system of claim 1, wherein said first jaw and said second jaw form an enclosed circular structure when closed.

3. The submersible ice fishing troller system of claim 1, wherein said first jaw and said second jaw each have a C-shaped structure.

4. The submersible ice fishing troller system of claim 1, wherein said line release is attached to a rear portion of said submersible unit.

5. The submersible ice fishing troller system of claim 1, wherein said submersible unit automatically travels to the bottom of an ice floor after said line release has been opened.

6. The submersible ice fishing troller system of claim 1, wherein said line release is attached to one of a plurality of control fins of said submersible unit.

7. The submersible ice fishing troller system of claim 1, wherein said submersible unit includes at least a first sonar.

8. The submersible ice fishing troller system of claim 1, wherein said control unit has a release switch for allowing a user to control the opening of said line release.

9. The submersible ice fishing troller system of claim 1, wherein said control unit includes a joystick for allowing control of said submersible.

10. A submersible ice fishing troller system, comprising:
    a submersible unit in communication with a control unit;
    a line release attached to said submersible unit, wherein said line release has a first jaw and a second jaw that form an opening that slidably receives a fishing line when in a closed position and for selectively releasing a fishing line when in an open position; and
    an actuator unit mechanically connected to said first jaw and said second jaw.

11. The submersible ice fishing troller system of claim 10, wherein said first jaw and said second jaw form an enclosed circular structure when closed.

12. The submersible ice fishing troller system of claim 10, wherein said first jaw and said second jaw each have a C-shaped structure.

13. The submersible ice fishing troller system of claim 10, wherein said line release is attached to a rear portion of said submersible unit.

14. The submersible ice fishing troller system of claim 10, wherein said submersible unit automatically travels to the bottom of an ice floor after said line release has been opened.

15. The submersible ice fishing troller system of claim 10, wherein said line release is attached to one of a plurality of control fins of said submersible unit.

16. The submersible ice fishing troller system of claim 10, wherein said submersible unit includes at least a first sonar.

17. The submersible ice fishing troller system of claim 10, wherein said control unit has a release switch for allowing a user to control the opening of said line release.

18. The submersible ice fishing troller system of claim 10, wherein said control unit includes a joystick for allowing control of said submersible.

* * * * *